United States Patent

[11] 3,603,527

[72] Inventors Edward R. Prelletz
 Chicago;
 Roland R. Rucinski, Villa Park, both of, Ill.
[21] Appl. No. 817,914
[22] Filed Apr. 21, 1969
[45] Patented Sept. 7, 1971
[73] Assignee Bell & Howell Company
 Chicago, Ill.

[54] MOUNTING APPARATUS FOR WEB-HANDLING MACHINE
 32 Claims, 7 Drawing Figs.
[52] U.S. Cl. .............................................. 242/195,
 242/192, 242/97, 352/78, 352/157
[51] Int. Cl. ................................................ G03b 1/04,
 G11b 15/32
[50] Field of Search ....................................... 242/195–205,
 192; 352/72–78, 157, 158

[56] References Cited
 UNITED STATES PATENTS
 3,363,853 1/1968 Irvin .............................. 242/195 X
 3,489,370 1/1970 Mouissie ........................ 242/198
 3,149,797 9/1964 Pastor et al. ................... 242/195
 3,297,267 1/1967 Wiggs ............................ 242/195
 3,434,783 3/1969 Sakaki et al. ................... 352/72
 3,494,690 2/1970 Wells ............................. 352/72
 3,399,842 9/1968 Winkler et al. ................. 242/205

Primary Examiner—Leonard D. Christian
Attorneys—Hume, Clement, Hume & Lee and William F. Pinsak ABSTRACT: There is disclosed a mounting apparatus for a web-handling machine adaptable for mounting either a web-carrying cartridge, having a reel contained within the cartridge, or a web-carrying reel, comprising a mounting structure having alignment means on the structure to locate the cartridge or reel in an operative position, means to lock the cartridge or reel in an operative position, aperture means within the mounting structure to enable the web to be fed into the web-handling machine and external rewinding means connected to the mounting structure and operable into an operative position for driving the conventional reel or the reel within the cartridge in a reverse direction.

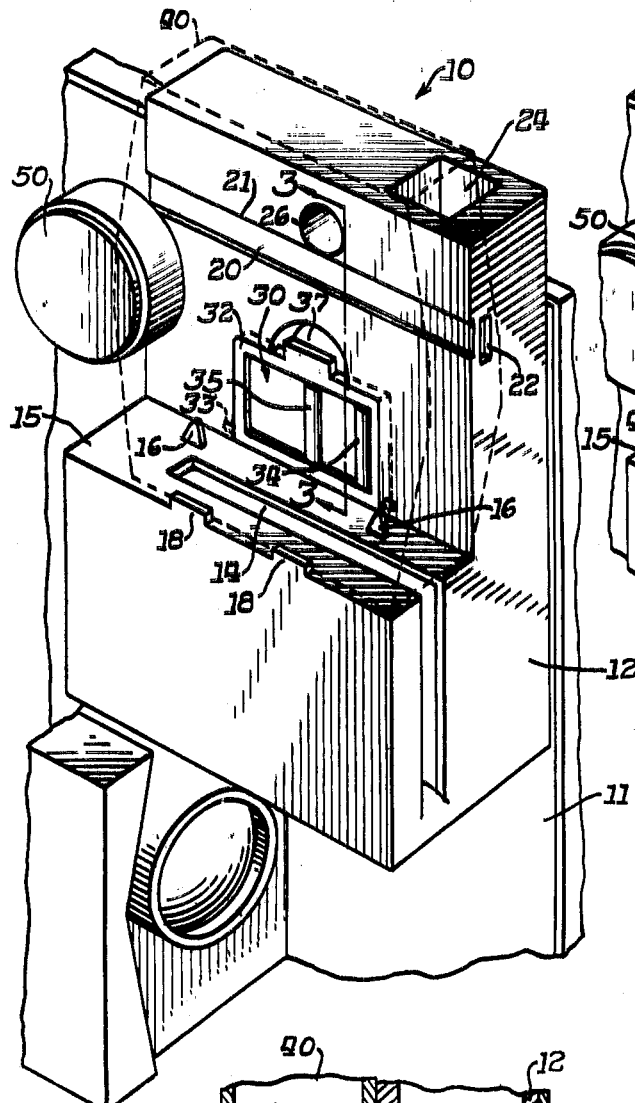
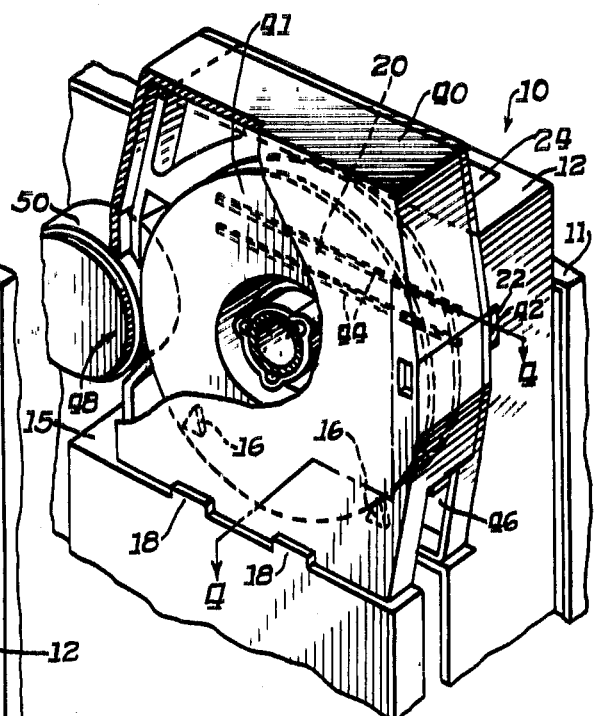
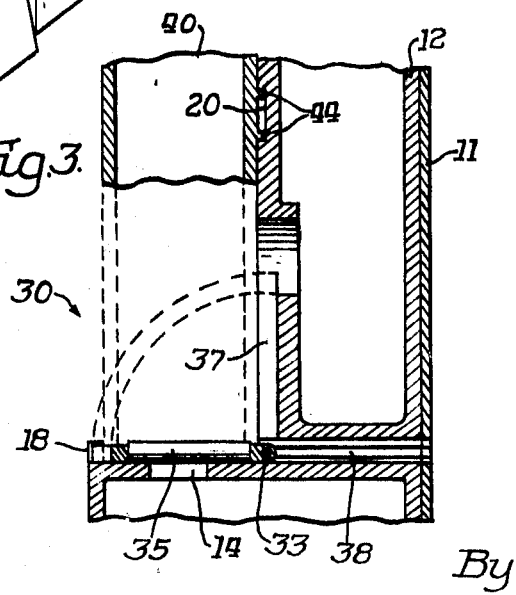
Fig.1.
Fig.2.
Fig.3.
Fig.4.
Inventors:
Edward R. Prelletz,
Roland R. Rucinski.
By
Atty

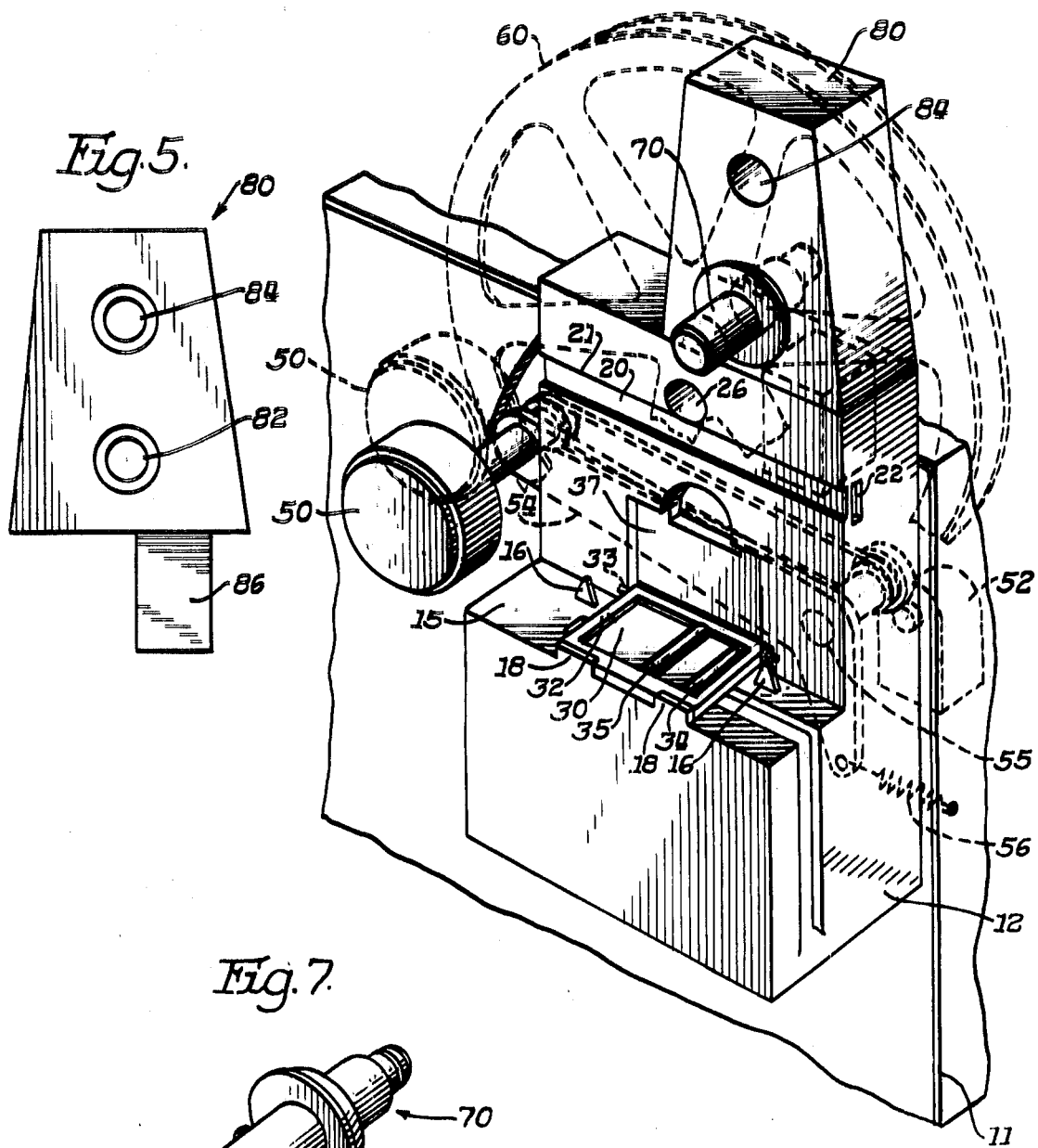

MOUNTING APPARATUS FOR WEB-HANDLING MACHINE

THE FIELD OF THE INVENTION

The present invention relates to a web-handling apparatus and particularly to a mounting structure on which either a cartridge-loaded supply or a reel-loaded supply may be supported and driven.

The present invention particularly provides a mounting structure or mounting module for use on a web-handling apparatus which enables it to be used with either a cartridge-loaded supply having a reel enclosed within the cartridge, or a reel-loaded supply. In the preferred embodiment of the invention, the web-handling apparatus is a motion picture projection apparatus and the web is motion picture film. The mounting structure or mounting module may replace the supply arm on a known projector. The mounting module utilizes a known projector mechanism beyond the shuttle mechanism. Within the mounting module or mounting structure, an automatic stripping and threading apparatus may be used. One such automatic stripping and threading apparatus is disclosed by Jack W. Thomson in application Ser. No. 706,243, filed Feb. 19, 1968 and assigned to the Bell & Howell Company. In the preferred embodiment, the mounting structure may be used for any reel-loaded cartridge having up to 400 feet of film loaded therein. Additionally, a reel adapter is designed to handle film reels designed to have between 400 and 500 feet of film wound thereon.

SUMMARY OF THE INVENTION

The general purpose of this invention is to provide a mounting structure or mounting module for a motion picture projector which enables the projector to utilize either a reel-enclosed cartridge such as that disclosed in a U.S. Pat. Application Ser. No. 826,045 filed by Edward R. Prelletz et al., on Apr. 21, 1969 entitled "Cartridge" and assigned to Bell & Howell Company, or a conventional reel supply, such as that obtained from a film-processing laboratory.

To attain this, the present invention contemplates utilizing a mounting module having alignment means to align the cartridge or reel in an operative position and locking means to maintain the cartridge or reel in this operative position. When a cartridge is used as a supply source, aperture means are provided within the mounting module to enable the stripping mechanism of the projector to automatically engage the film within the cartridge and feed the film automatically into the threading mechanism. When a conventional film reel is used as a supply source, a film guide means is inserted over the aperture in the mounting module and the film from the reel is then guided into the threading mechanism of the projector. An external rewind means is connected to the mounting structure which drives the cartridge reel or the conventional reel in a reverse direction. By utilizing this structure, a free turning spindle may be utilized without requiring a reverse drive mechanism for it.

Thus, an object of the present invention is the provision of a mounting structure for a web-handling apparatus which enables the use of a cartridge or a reel supply.

Another object is to provide a mounting structure for a web-handling apparatus which enables the use of a cartridge supply having a film reel within the cartridge.

A further object is the provision of a mounting apparatus capable of accurately aligning a cartridge supply in an operative position.

Still another object is to provide a compatible cartridge and reel projection system utilizing automatic stripping and threading of the film during the utilization of a cartridge-loaded supply.

Other objects and many of the attendant advantages of this invention will be readily appreciated as the same become better understood by reference to the following detailed description when considered in connection with the accompanying drawings in which like reference numerals designate like parts throughout the figures thereof.

BRIEF DESCRIPTION OF THE DRAWINGS

FIG. 1 is a perspective view of a mounting structure embodying the features of the present invention and shown in connection with a motion picture projector;

FIG. 2 is a perspective view showing a cartridge utilized in connection with the mounting structure shown in FIG. 1;

FIG. 3 is an enlarged cross-sectional view of the film guide taken on the line 3—3 of FIG. 1;

FIG. 4 is an enlarged fragmentary view of the alignment means and locking means taken on the line 4—4 of FIG. 2;

FIG. 5 is an end view of the reel adaptor;

FIG. 6 is a perspective view of the mounting structure showing the reel adpator of FIG. 5; and FIG. 7 is a perspective view of the spindle utilized in connection with the adapter shown in FIG. 5.

DESCRIPTION OF THE PREFERRED EMBODIMENTS

Referring now to the drawings, wherein like reference characters designate like or corresponding parts throughout the several views, there is shown in FIG. 1, which illustrates a preferred embodiment, a mounting module 10 is attached to a projector housing 11 by conventional fastening means not shown. A known projector from the shuttle mechanism onward may be used with the mounting module 10 mounted ahead of the shuttle to support a film supply. Mounting module 10 comprises a hollow mounting structure 12 having an aperture 14 therein. Mounting structure 12 is shaped to form a seat 15 which is capable of supporting a cartridge 40 shown in broken lines. Within the hollow mounting structure 12, an automatic stripping and threading mechanism is inserted. One such automatic stripping and threading mechanism is disclosed in a U.S. Pat. Application of Jack W. Thomson, Ser. No. 706,243, filed Feb. 19, 1968 and assigned to the Bell & Howell Company. However, any other automatic stripping and threading mechanism may be utilized within mounting module 10.

Seat 15 is designed to properly support a film cartridge 40. The width of seat 15 is solely dependent upon the width of cartridge 40. For example, an 8 mm. cartridge is narrower than a 16 mm. cartridge. In the preferred embodiment, seat 15 is designed to support a cartridge such as that disclosed in a U.S. Pat. Application Ser. No. 826,045 filed by Edward R. Prelletz et al. on Apr. 21, 1969 entitled "Cartridge" and assigned to the Bell & Howell Company. Referring to FIG. 2 it is shown that cartridge 40 has a film-loaded reel 41 contained within. A pair of alignment apertures 45 (FIG. 4) and a pair of parallel ribs 44 (FIG. 3) are also provided. A mounting tab 42 extends outwardly from the rear of the cartridge. Lastly, a threading aperture 46 and rewind opening 48 is also provided in cartridge 40.

Means are provided on mounting 12 to properly align cartridge 40 upon seat 15. Again referring to FIG. 1 in conjunction with FIGS. 2, 3 and 4, an alignment means comprising a pair of upwardly projecting alignment pins 16 is shown. Alignment pins 16 are adapted to fit into alignment aperture 45 in cartridge 40. A pair of alignment guides 18 are provided along the outer edge of seat 15. These alignment guides 18 prevent cartridge 40 from shifting outwardly from mounting module 10. It will be understood by one skilled in the art that any number of alignment pins and alignment guides can be utilized and their placement along the seat solely depends upon the width and configuration of the cartridge utilized.

Mounting module 10 further comprises a groove 20 having an upper surface 21. Groove 20 and upper surface 21 cooperate with ribs 44 on cartridge 40 to further insure proper alignment of cartridge 40. Groove 20, alignment pins 16, and alignment guides 18 cooperate to automatically align cartridge 40 in its operative position for stripping and threading.

A depression 22 is provided on each side of mounting structure 12 and acts as a locking means to maintain the cartridge 40 in a fixed position. Referring to FIGS. 2 and 4, it will be seen that depression 22 cooperates with mounting tab 42 on cartridge 40 to form a locking means to maintain cartridge 40 in its operative position. Depression 22 engages mounting tabs 42 thereby forming an effective lock or restraining means to enable the cartridge to firmly sit upon the mounting structure 12. While only two depressions are disclosed, it is recognized that any number of depressions or other equivalent locking means could be utilized depending upon the shape of the cartridge. It will be understood that any cartridge may be modified to contain alignment apertures as well as mounting tabs and may be used in connection with mounting module 10.

As mentioned above and referring to FIG. 1, an aperture 14 is present within seat 15. Aperture 14 provides an opening to the hollow interior of mounting structure 12. Placed within this hollow interior is a stripping and threading means. Any stripping and threading means may be utilized within this interior. Stripping is defined as the removal of the outer convolution of film from the cartridge or reel. In order to thread a projector, the film must first be striped from the reel or cartridge. This stripping may be done automatically or manually. As mentioned above, one such automatic stripper is disclosed in the Thomson application. Film from either a cartridge 40 or a reel 60 as shown in FIG. 5 may be fed into aperture 14. The film is then threaded into the projector by the automatic threading means therein. Any automatic threading means may be contained within the hollow portion of mounting module 10.

When a cartridge 40 is seated in its operative position as shown in Fig. 2, the automatic stripping mechanism of the projector removes the film from cartridge 40 through threading aperture 46 and the automatic threading mechanism of the projector then threads the projector.

When a film reel 60 is used as a supply source, as shown in FIG. 6, it is necessary to strip the film manually from the reel 60 and place the film into aperture 14 for threading to occur. To insure proper alignment for threading, a film guide 30 is used. Referring to FIG. 1 in conjunction with FIGS. 3, 5 and 6, it is seen that an adapter aperture 24 and spindle receptacle 26 are provided within the upper portion of mounting structure 12. A recess 37 is provided along the cartridge facing vertical side of mounting structure 12. Within recess 37 is film guide 30. Film guide 30 is composed of a frame 32 which in the preferred embodiment is rectangular in shape. A roller means 34 is provided adjacent to one end of film guide 30 and a second roller means 35 is provided in a spaced relationship therefrom. As shown in FIG. 3, film guide 30 may assume a plurality of positions. When mounting module 10 is used in conjunction with a cartridge, the film guide is in a recessed position. This recessed position may be in the vertical recess 37 shown in FIGS. 1 and 3. Alternatively, a slot 38 can be provided into which film guide 30 may recede when in its nonoperative position when a cartridge is being used.

FIG. 3 shows film guide 30 in its operative position when a reel is being utilized as a film supply means. The frame 32 of film guide 30 is placed transverse to aperture 14. To mount a reel on mounting module 10, a spindle 70 (FIG. 7) must be inserted in spindle receptacle 26. Alternatively, a reel adapter 80, shown in FIG. 5, may be inserted into adapter aperture 24, of course, other prior art mounting relationships such as fixed, pivotable, and retractable, among others, may be utilized. This provides additional spindle receptacles 82 and 84 to accommodate larger film reels. FIG. 6 shows reel adapter 80 in its operative position.

Regardless of which spindle receptacle is utilized, the film from the reel is placed under roller 34 of film guide 30. Feeding of film under roller 34 causes the film to pass under roller 35 and down through aperture 14 into the threading means of the projector. Hinge 33 is provided to allow film guide 30 to swing between the operative position as shown in FIG. 6 and the inoperative position as shown in FIG. 1. Alternatively, hinge means 33 may be removed and a sliding arrangement may be utilized whereby film guide 30 slides into slot 38 when a cartridge is being projected (FIG. 3).

The operation of the mounting module during projection may best be explained by again referring to FIG. 1 in conjunction with FIGS. 2 and 4. A cartridge 40 is positioned upon seat 15 of mounting structure 12. Alignment pins 16 engage alignment apertures 45 in the underside of cartridge 40. Alignment guides 18 prevent cartridge 40 from sliding outwardly from seat 15. Ribs 44 of cartridge 40 engage the upper surface 21 of groove 20, thereby maintaining the cartridge in a fixed position on seat 15. Mounting tabs 42 on the rear of cartridge 40 then engage depression 22 on mounting structure 12 forming a locking means to hold the cartridge 40 in place. Alignment pins 16, alignment guides 18, and grooves 20 form an alignment means to locate the cartridge in an operative position. Depression 22 forms a locking means for maintaining the cartridge in the operative position mentioned.

During the stripping and threading mode of operation, as mentioned above, the film is stripped from the cartridge 40 by the stripping apparatus of the projector and passes through threading aperture 46 and aperture 14 in seat 15. The film is engaged by the threading apparatus contained within mounting structure 12 and is fed toward the shuttle mechanism of the projector. After threading, the film is forwardly projected until the operator desires to reversely project a portion of the film, or at the end of forward projection, to rewind the film. For both reverse or rewind modes, the supply reel is driven by an external drive puck 50 to cause that reel to function as a takeup member.

Referring now to FIGS. 2 and 6, there is shown a drive puck 50 powered by a motor 52 which is schematically shown. Drive puck 50 is supported on an arm 54 mounted to pivot about a point 55 under the influence of a biasing means such as spring 56, in at least one direction. The drive puck 50 is external to mounting structure 12. Drive puck 50 is operable into an operative position for rewinding and reverse projection and an inoperative position for forward projection and the stripping and threading modes. The broken lines shown in FIG. 6 illustrates drive puck 50 in its operative position engaging the edge portion of reel 60. The solid lines illustrate the inoperative position of drive puck 50. To rewind the film onto reel 60 or into cartridge 40, the projector is actuated for rewind mode operation. Puck-supporting arm 54 is then moved either automatically or manually into its operative position as shown in FIG. 6. Drive puck 50 engages the flanges of reel 60 thereby driving the reel and rewinding the film.

Similarly when a cartridge is utilized, drive puck 50 engages the reel 41 within the cartridge (See FIG. 2) through rewind opening 48 and thereby reloading the cartridge in a manner similar to the reloading of the external reel. When the reverse or rewinding mode is completed, the drive puck 50 is released from its operative position for movement to its inoperative position. With this arrangement, the external drive puck 50 is operable only during the reverse or the rewind mode and drives the reel 60 or the cartridge reel 41 in a reverse direction. At all other times, it is in its inoperative position.

FIG. 5 shows a reel adapter 80 having spindle receptacles 82 and 84. These receptacles are identical to receptacle 26 shown in FIG. 1 on mounting structure 12. When it is desired to use a reel of film having either 50 or 100 feet wound thereon, a spindle 70, shown in FIG. 7, is inserted in spindle receptacle 26. Film guide 30 is placed in its operative position as described above and the reel placed upon spindle 26, and the film from the reel is inserted under roller 34 and into aperture 14 for threading. When it is desired to rewind the reel, drive puck 50 is engaged as described above. The arcuate path of travel of drive puck 50 is determined by the length of arm 54 and the positioning of pivot point 55. By utilizing only a 50 or 100 foot reel of film, the drive puck 50 accurately engages the flanges of the reel 60 as shown in FIG. 6. However, when larger reels are utilized it is necessary to reposition the spindle. Therefore, a reel adapter 80 is inserted into aperture 24 thus providing two additional spindle receptacles 82 and 84. Spindle receptacle 82 is used when a reel of film having 200 feet of film is used, and spindle receptacle 84 is used when a reel contains 400 feet or more of film wound thereon. In this manner, the drive puck 50 will engage the flanges of reel 60 in its proper position. It will be clearly recognized by one skilled in the art that in order to eliminate the use of the adapter, it is only necessary to reposition spindle receptacle 26 and lengthen arm 54 in order that drive puck 50 would engage reel 60 in its proper position thus eliminating the necessity of utilizing a reel adapter 80. However, the preferred embodiment for aesthetic purposes utilizes a reel adapter. This enables a more compact mounting module 10 and a shorter arm 54 for drive puck 50.

The above mounting module may be utilized with any conventional film reel as 60 as shown in FIG. 5 and may also be used in connection with a cartridge having a reel within and containing a threading aperture 36 and a rewind opening 48 therein. Appropriate alignment apertures are provided in the underside of the cartridge to enable the cartridge to be engaged in its operative position on mounting module 10. Mounting module 10 provides a unique alignment means for the cartridge as well as the unique locking means wherein the cartridge is automatically placed in its operative position. It can be clearly seen that the mounting module does not contain any drive means. The only associated drive means are the external drive puck which is used only during the reverse and rewind mode of the operation of the projector. Thus it is seen that either the cartridge or reel may be supported on mounting module 10. Although a specific embodiment of the invention has been described, it is to be understood that modifications and variations may be made therein without departing from the scope of the novel concepts thereon.

We claim:

1. In a motion picture projection apparatus having a housing incorporating film stripping and threading means, drive and projection means, and operable in a plurality of modes including a stripping mode, a threading mode, a projection mode and a rewind mode, the improvement comprising:
   a mounting structure adapted to mount a film-carrying reel to said housing;
   alignment means on said mounting structure to locate said reel in an operative position on said mounting structure;
   means to lock said reel in said operative position;
   aperture means in said mounting structure to enable said threading means and said stripping means to engage said film during said stripping mode; and
   external rewind means connected to said mounting structure and operable into an operative position for driving said reel in a reverse direction.

2. The improvement of claim 1, wherein said rewind means is operable between said operative position during said rewind mode, and an inoperative position during said threading mode and said forward projection mode.

3. The improvement of claim 2, wherein said film-carrying reel is contained within a cartridge.

4. In a motion picture projection apparatus having a housing incorporating film-stripping, -threading, -drive and -projection means, and operable in a plurality of modes including a film-stripping mode, a threading mode, a forward projection mode, and a reverse mode, the improvement comprising:
   a mounting structure adapted to mount a cartridge to said housing;
   said cartridge including a film-carrying reel therein;
   alignment means on said mounting structure to locate said cartridge in an operative position on said mounting structure;
   means to lock said cartridge to said mounting structure in said operative position;
   aperture means in said mounting structure to enable said stripping means to automatically engage said film during said stripping mode; and
   rewind means connected to said mounting structure and operable into an operative position for driving said reel in a reverse direction.

5. The improvement of claim 4, wherein said rewind means is operable between said operative position during said reverse mode, and an inoperative position during said forward projection mode and said stripping and threading modes.

6. The improvement of claim 4 wherein said alignment means includes an upwardly projecting pin for engagement with said cartridge.

7. The improvement of claim 4, wherein said alignment means includes a groove means for engagement with said cartridge.

8. The improvement of claim 6, wherein said alignment means further includes a groove means for engagement with said cartridge.

9. The improvement of claim 8, wherein said alignment means further includes an upwardly projecting guide means for maintaining said cartridge in said operative position.

10. The improvement of claim 4, wherein said locking means comprises a depression in said mounting structure positioned for engagement with said cartridge, to maintain said cartridge in said operative position.

11. In a motion picture projection apparatus having a housing incorporating film-stripping, -threading, -drive and -projection means, and operable in a plurality of modes including a film-stripping mode, a threading mode, a forward projection mode, and a reverse mode, the improvement comprising:
   a mounting structure adapted to mount a cartridge to said housing;
   said cartridge including a film-carrying reel therein;
   alignment means on said mounting structure to locate said cartridge in an operative position on said mounting structure, wherein
   said alignment means comprises a pair of upwardly projecting pins for engagement with said cartridge,
   a groove means for engagement with said cartridge, and
   upwardly projecting guide means for maintaining said cartridge in said operative position;
   means to lock said cartridge to said mounting structure in said operative position comprising a plurality of depressions positioned for engagement with said cartridge to maintain said cartridge in said operative position;
   aperture means in said mounting structure to enable said stripping means to automatically engage said film during said stripping mode; and
   external rewind means operable between an operative position during said reverse mode, for driving said reel in a reverse direction and an inoperative position during said forward projection mode, said stripping mode and said threading mode.

12. The improvement of claim 2, wherein said alignment means comprises a spindle receptacle.

13. The improvement of claim 12, wherein said locking means comprises a spindle means in operative engagement with said spindle receptacle.

14. The improvement of claim 2, further comprising a film guide means connected to said mounting structure, said film guide means operative to guide said film into said said aperture in said mounting structure.

15. The improvement of claim 14, wherein said film guide means comprises roller means for guiding said film into said aperture.

16. The improvement of claim 13, further comprising adapter means for changing the position of said spindle receptacle.

17. In a motion picture projection apparatus having a housing incorporating film-threading, -drive and -projection means, and operable in a plurality of modes including a threading mode, a forward projection mode, and a reverse mode, the improvement comprising:
   a structure adapted for mounting a film carrying reel to said housing;

alignment and locking means comprising a bully rotatable removable spindle means connected to said mounting structure to locate said reel in an operative position;

aperture means in said mounting structure;

film guide means connected to said mounting structure to guide said film into said aperture means to enable said threading means to operatively engage said film during said threading mode; and external rewind means operable between an operative position during said reverse mode for driving said reel in a reverse direction and an inoperative position during said forward projection mode and said threading mode.

18. In a motion picture projection apparatus having a housing incorporating film-threading, -drive and -projection means, and operable in a plurality of modes including a threading mode, a forward projection mode, and a reverse mode, the improvement comprising:

a mounting structure adapted to alternatively mount a cartridge, having a film-carrying reel within said cartridge and a film-carrying reel to said housing;

aperture means in said mounting structure to enable said film to be threaded during said threading mode;

guide means operably positioned for guiding said film to said threading means when a reel is mounted on said housing, and being movable to an inoperative position during the guiding of film when a cartridge is mounted on said housing.

19. The improvement of claim 18 wherein said film guide means is movable between said operative and said inoperative position with respect to said housing.

20. The improvement of claim 18 wherein said film guide means includes a frame storable within said housing.

21. The improvement of claim 18 wherein said film guide means includes roller means for guiding said film from said reel through said aperture in said mounting structure.

22. The improvement of claim 18 wherein said film guide means includes a frame pivotally carried on said housing.

23. In a motion picture projection apparatus having a housing incorporating film-threading, -drive and -projection means, and operable in a plurality of modes including a threading mode, a forward projection mode and a reverse mode, the improvement comprising:

a mounting structure adapted to alternatively mount a cartridge, having therein a first film-carrying reel, and a second film-carrying reel to said housing;

alignment means on said mounting structure to locate said cartridge in an operative position on said mounting structure;

means to lock said cartridge to said mounting structure in said operative position;

aperture means in said mounting structure to enable said threading means to engage said film during said threading mode;

film guide means associated with said mounting structure adapted to guide said film contained on said second film-carrying reel into said aperture during said threading mode; and external rewind means connected to said mounting structure and operable into an operative position for alternatively driving said cartridge reel and said film-carrying reel in a reverse direction.

24. In a motion picture projection apparatus having a housing incorporating film threading, drive and projection means, and operable in a plurality of modes including a threading mode, a forward projection mode and a reverse mode, the improvement comprising:

a mounting structure adapted to alternatively mount a cartridge, having therein a film carrying reel, and a film carrying reel to said housing;

alignment means on said mounting structure to locate said cartridge in an operative position on said mounting structure;

means to lock said cartridge to said mounting structure in said operative position;

aperture means in said mounting structure to enable said threading means to engage said film during said threading mode;

a movable film guide means connected to said mounting structure and operable into a first position when said cartridge is utilized and a second position when said film carrying reel is utilized; and external rewind means connected to said mounting structure and operable into an operative position for alternatively driving said cartridge reel and said film carrying reel in a reverse direction.

25. The improvement of claim 24, further comprising spindle means to operatively engage said film-carrying reel.

26. The improvement of claim 25 further comprising adapter means changing the position of said spindle means.

27. The improvement of claim 26 wherein said rewind means is operable between said operative position during said reverse mode, and an inoperative position during said forward projection mode and threading mode.

28. In a web-handling apparatus operable in a forward mode, a reverse mode, a stripping mode and a threading mode, having a housing, a stripping means and a threading means, the improvement comprising:

a structure adapted for mounting a web-carrying reel to said housing;

alignment means on a said mounting structure to locate said reel in an operative position on said mounting structure;

means to lock said reel in said operative position;

aperture means in said mounting structure to enable said stripping means and threading means to engage said web during said stripping mode; and external rewind means connected to said mounting structure and operable into an operative position for peripherally driving said reel in a reverse direction.

29. In a web-handling apparatus operable in a forward mode, a reverse mode, a stripping mode, and a threading mode, having a housing and a stripping and threading means, the improvement comprising:

a mounting structure adapted to mount a cartridge to said housing;

said cartridge including a film-carrying reel therein;

alignment means on said mounting structure to locate said cartridge in an operative position on said mounting structure;

means to lock said cartridge to said mounting structure in said operative position;

aperture means in said mounting structure to enable said stripping means to automatically engage said web during said stripping mode; and rewind means connected to said mounting structure and operable into an operative position for driving said reel in a reverse direction.

30. In a web-handling apparatus operable in a forward mode, a reverse mode, and a threading mode, having a housing and threading means, the improvement comprising:

a mounting structure adapted to alternatively mount a cartridge having a first web-carrying reel within said cartridge and a second web-carrying reel to said housing;

alignment means on said mounting structure to locate said cartridge in an operative position on said mounting structure;

means to lock said cartridge to said mounting structure in said operative position;

aperture means in said mounting structure to enable said threading means to engage said web during said threading mode;

film guide means associated with said mounting structure adapted to guide said web contained on said second web-carrying reel into said aperture during said threading mode; and external rewind means connected to said mounting structure and operable into an operative position for alternatively driving said cartridge reel and said web-carrying reel in a reverse direction.

31. In a web-handling apparatus operable in a forward mode, a reverse mode, a stripping mode, and a threading mode, having a housing and a stripping and a threading means, the improvement comprising:

a mounting structure adapted to mount a cartridge to said housing;

said cartridge including a web-carrying reel therein;

alignment means on said mounting structure to locate said cartridge in an operative position on said mounting structure wherein;

said alignment means comprises a pair of upwardly projecting pins in engagement with said cartridge, a groove means for engagement with said cartridge and upwardly projecting guide means for maintaining said cartridge in said operative position;

means to lock said cartridge to said mounting structure in said operative position comprising a plurality of depressions positioned for engagement with said cartridge;

aperture means in said mounting structure to enable said stripping means to automatically engage said web during said stripping mode; and external rewind means operable between and operative position during said reverse mode for driving said reel in a reverse direction and an inoperative position during said forward mode and said threading mode.

32. In a web-handling apparatus operable in a forward mode, a reverse mode, and a threading mode, having a housing and threading means, the improvement comprising:

a structure adapted for mounting a web-carrying reel;

alignment and locking means comprising a removable spindle means connected to said mounting structure to locate said reel in an operative position;

aperture means in said mounting structure;

web guide means connected to said mounting structure to guide said web into said aperture means to enable said threading means to operatively engage said web during said threading mode; and external rewind means operable between an operative position during said reverse mode for peripherally driving said reel in a reverse direction and an inoperative position during said forward mode and said threading mode.

UNITED STATES PATENT OFFICE
CERTIFICATE OF CORRECTION

Patent No. 3,603,527           Dated  September 7, 1971

Inventor(s)  Edward R. Prelletz; Roland R. Rucinski

It is certified that error appears in the above-identified patent and that said Letters Patent are hereby corrected as shown below:

Column 1, line 73, " become " should be --becomes--.

Column 2, line 17, " adpator " should be --adaptor--.

Column 3, line 23, " striped " should be --stripped--.

Column 7, line 1 " bully " should be -- fully --.

Column 8, line 27, " a " should be deleted from patent.

Signed and sealed this 11th day of July 1972.

(SEAL)
Attest:

EDWARD M. FLETCHER, JR.            ROBERT GOTTSCHALK
Attesting Officer                  Commissioner of Patents